March 9, 1954 P. W. GARBO 2,671,796
HYDROCARBON SYNTHESIS AND APPARATUS THEREFOR
Filed Dec. 18, 1948
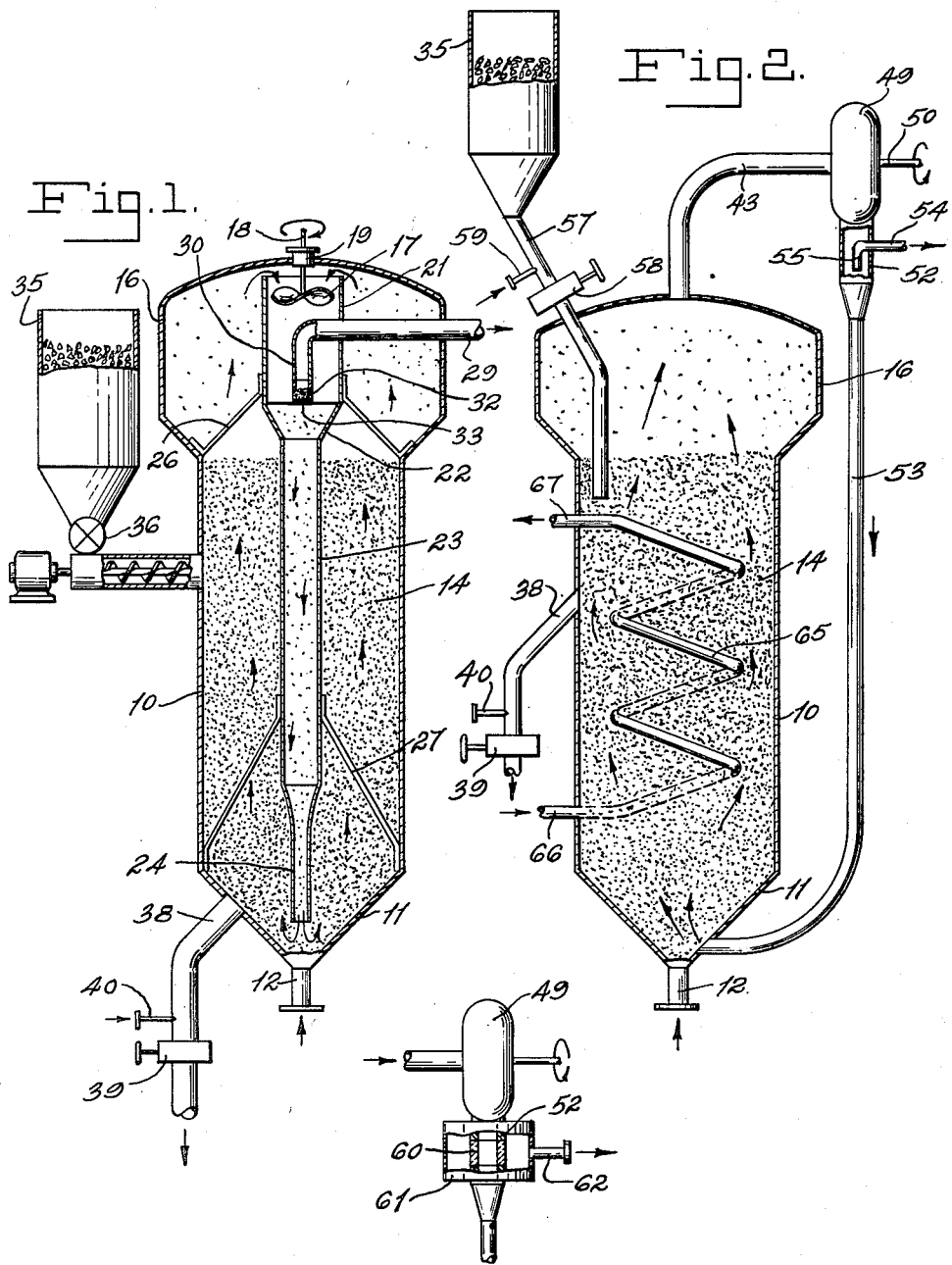
INVENTOR.
PAUL W. GARBO
BY
ATTORNEYS Patented Mar. 9, 1954

2,671,796

UNITED STATES PATENT OFFICE 2,671,796

HYDROCARBON SYNTHESIS AND APPARATUS THEREFOR

Paul W. Garbo, Freeport, N. Y., assignor to Hydrocarbon Research, Inc., New York, N. Y., a corporation of New Jersey Application December 18, 1948, Serial No. 66,062

7 Claims. (Cl. 260—449)

The present invention relates to solid-gas contact and more particularly is concerned with effecting contact between a reactant gas and a substantial body of fluidized solid particle material under conditions of intimate and uniform contiguity, with effective separation of solid particles from the gas after a predetermined period of association.

More particularly, the invention contemplates effecting passage of a flow of a feed gas, which flow, per se, is inadequate to support fluidization of the solid particle contact mass, and at the same time recirculating gas which has passed through the contact mass so that the particles of the mass are continuously maintained in a highly turbulent state of fluid aeration. Product separation is effected by withdrawing part of the gasiform effluent from a zone of high velocity flow where the particles move with substantial momentum past the point of gas withdrawal.

To this end, the invention involves the continual passage of a fresh stream of gas or vapor upwardly through a reaction zone containing a mass of solid particle contact material maintained in a fluidized condition. The effluent gases accumulating above the contact mass are drawn into a mechanical impelling means, such as a fan or blower, and are directed downwardly at a high velocity to a lower portion, preferably near the bottom, of the reaction zone. On the discharge side of the impelling means at a point where streamline flow has been established at a substantial velocity, a portion of the recirculating stream is withdrawn as product through a tube or duct so disposed that the particles tend to be projected past the inlet end of the tube at a relatively high velocity and thus are separated from the withdrawn gasiform product.

Advantageously, the volume of gases recirculated by the propeller is substantial as compared with the fresh feed gases supplied to the reaction zone; for example, the volume rate of recirculation may amount to from 1 to 10, or more, times the rate at which the fresh gas is supplied to the system. As a result, such a linear velocity of gaseous upflow is maintained in the reaction zone that desirable dense phase fluidization prevails in spite of a fresh gas feed rate which would, by itself, be incapable of producing such an effect. The invention is of particular advantage in chemical processes involving large heat changes, i. e., highly exothermic and highly endothermic reactions. For instance, the invention finds valuable application in the exothermic synthesis of hydrocarbons from hydrogen and carbon monoxide and in the endothermic pyrolysis of solid fuels like oil shale, coal and tar sands to recover gaseous and liquid hydrocarbons therefrom.

The invention has the additional advantage that the entrained or suspended particles which invariably are carried by the gases leaving the fluidized mass are simply and effectively removed from the portion of these gases which is withdrawn as product stream.

While obviously of broad applicability, the present invention is particularly advantageous in the catalytic synthesis of hydrocarbons, oxygenated hydrocarbons and mixtures thereof from hydrogen and carbon monoxide wherein optimum conditions of reaction, from the standpoint of maximum yield, include such factors as sensitive temperature control and prompt removal of entrained catalyst particles from the withdrawn product stream. In addition, the invention is of advantage in overcoming excessive loss of catalyst from the reaction zone without employing the usual cumbersome and expensive separators.

In order to more specifically describe the invention, reference is had to the attached drawing wherein Figures 1 and 2 exemplify more or less diagrammatically reactors constructed in accordance with the present invention, and Figure 3 details an alternate construction applicable specifically to the recirculation line of Figure 2.

The numeral 10 of Figure 1 designates a more or less cylindrical reactor having a conical bottom 11, supplied with fresh reactant gas, through inlet 12, located at the apex thereof. For example, the feed gas may comprise a mixture of hydrogen and carbon monoxide in approximately 2:1 molar ratio. The reaction gases flow upwardly through a fluidized mass of finely powdered catalyst 14 into the upper cylindrical portion 16 of the reactor. The effluent gases, containing suspended or entrained particles, are immediately drawn to the rotating propeller 17, which is preferably driven at a substantial speed by suitable driving means (not shown) mounted exteriorly of the reaction chamber to drive the propeller shaft 18 carried in bearing 19.

As a result, the propeller imparts to the gaseous stream and suspended solid particles a substantial linear velocity downwardly through tubular conduit 21. In the embodiment shown, the conduit 21 is tapered as at 22 and connects with a coaxially arranged conduit 23, somewhat smaller in diameter, terminating near the bottom of the reaction zone in outlet portion or nozzle 24.

Suitable annularly spaced brackets 26 and 27 support the central conduit arrangement vertically, and preferably coaxially in the reactor. However, it is contemplated that the location of the downflow conduit may be varied widely, and it is advantageous in some instances to distribute a number of such conduits, either by providing a number of parallel branch conduits communicating with impeller 17 or by employing several spaced impeller-downflow conduit units so that gas flow is evenly distributed to the bottom of the reaction zone.

Separation of product gases is effected in the high velocity stream beyond the propeller 17 by means of an outlet conduit 29, extending into the central portion of the recirculation tube 21, and having a leg 30 projecting downwardly in coaxial relationship. In the embodiment shown, the withdrawal port comprises a tubular filter 32, preferably formed of some porous metal, ceramic or refractory material and terminating at its bottom end in an impermeable wall 33.

It is important to note that in this embodiment, the outer surfaces of the filter element form an extension of the walls of the pipe leg 30, being disposed parallel to the direction of gas flow. As a result, the momentum of the entrained particles not only tends to project them past the port or filter surfaces but actually effects a bombardment and positive displacement of any particles which might otherwise adhere to the surfaces under the influence of the product stream flowing through the filter. Thus, as intimated above, the invention overcomes the clogging of the filter surfaces heretofore inherent in the usual arrangements for withdrawing solid particle-laden product gases through filters.

It is important to note that the invention particularly contemplates withdrawal of the product gases from a zone of streamline gas flow. To this end, it should be observed that the length of the pipe leg 30 is such as to dispose the filter port beyond the point of disturbance occasioned by the radially projecting pipe 29. Stated in another way, the outlet port is disposed sufficiently beyond or downstream from the zone of eddies or turbulence to permit reestablishment of streamline flow in the zone of the filter surfaces.

For the purpose of permitting addition of solid particles, a supply hopper 35 discharges through a mechanically driven feeder 36 into reactor 10. The particles in the hopper 35 may be catalyst, reactant solids or the like, depending upon the nature of the reaction contemplated. A draw-off standpipe 38 controlled by a valve 39 permits the controlled withdrawal of used solid particles, that is to say, reacted solids, catalyst or the like, as the case may be. A gas may be injected into the standpipe 39 as at 40 to fluidize the contents and avoid clogging.

In operation, it will be apparent that the gases flowing upwardly about the recirculation tube 23 comprise the fresh feed gases plus the recirculated gases adjusted to a linear velocity at which the desired ideal condition of fluidization prevails. The gases are repeatedly contacted with the solid particles to the extent required for completing the reaction and the gaseous product effluent continuously separated, free from entrained solid particles.

The embodiment of Figure 2 comprises a reactor similar in external form to that disclosed in Figure 1, identical reference numerals having been applied to designate corresponding parts. In this embodiment, the effluent gases, with their content of entrained or suspended particles, are withdrawn from the top of the reaction vessel through outlet pipe 43 into a centrifugal blower 49 driven by any suitable motive means, not disclosed, through shaft 50. The thus impelled gases pass downwardly through enlarged tube 52 into narrow tube 53 which conducts them at a substantial velocity to the bottom of the reaction zone for redirection upwardly through the fluidized phase from a point near the inlet pipe 12, as indicated.

The product gases are withdrawn from the tube 52 at a point beyond the blower 49 through an outlet pipe 54 which, as in Figure 1, extends radially into the conduit 52 and is provided with axially extending leg 55. It is to be noted, in contrast to Figure 1, that the present embodiment omits the filter, and in lieu thereof provides an outlet port at the free, open extremity of the pipe, which faces downstream, such that the rapidly moving particles are positively projected beyond said opening in the normal course of recycling gaseous effluent from the fluidized mass. As a result, a substantial though minor portion of the total stream of gas may be continuously separated substantially free from entrained solids.

If desired, replenishment of the solid particle contact mass may be effected by controlledly introducing feed solids from the hopper 35, as before, through standpipe 57, controlled by valve 58. Free flow of the solids may be facilitated by injecting any suitable gas or steam through pipe 59.

Figure 3 illustrates one modification of Figure 2, applicable broadly to all embodiments of the present invention, which overcomes the flow disturbance occasioned by the radially extending leg of an internal outlet conduit. In this embodiment, it will be noted that the outlet zone 52 of the recirculation conduit is occupied by a cylindrical insert 60 of a porous walled material of good filtering characteristics effective to separate entrained solid particles from the gaseous stream withdrawn as product. A manifold jacket 61 surrounds the porous filter 60 as indicated, and is provided with an outlet 62 through which the product gases are withdrawn.

It is to be noted that the inner surfaces of the cylindrical filter 60 form a continuation of the inner surfaces of the conduit 52, parallel to the direction of flow therein and thus avoid gas stream turbulence. As in the previous embodiments, the filter is preferably disposed sufficiently downstream from the point of disturbance occasioned by the blower 49 to assure restablishment of streamline flow.

A heat exchanger more or less symbolically indicated by the helical coil 65 in Figure 2 may be provided to meet the thermal requirements of the reaction. This exchanger may take other forms, as for example, a plurality of spaced, vertical tubes joined by suitable upper and lower headers.

In this way it is possible to distribute substantial areas of heat exchange surface throughout the fluidized phase. For example, in the case of the hydrocarbon synthesis reaction referred to above, uniform, regulated temperatures may be held in the reaction zone by introducing a suitable coolant, such as Dowtherm or water, into the lower or inlet extremity 66 of the tube 65 and withdrawing the coolant from outlet 67.

While the foregoing discloseure has been exemplified largely in terms of the catalytic synthesis of hydrocarbons from a synthesis gas comprising hydrogen and carbon monoxide, it is not in its broadest aspects so limited, but contemplates in general all forms of solid-gas contact, wherein the solid particles either exert a catalytic effect or else react chemically with the gaseous stream and thereby are converted to a desired solid product which can be continuously withdrawn from the reaction zone. The solid particle feeding and withdrawing instrumentalities shown in the figures of the drawing are important in this latter regard and may, if desired, be adjusted to effect a continuous feed of fresh solid material and corresponding simultaneous withdrawal of the product solids.

Among the processes to which the present process is applicable are: the catalytic synthesis of ammonia from hydrogen and nitrogen, vapor-phase catalytic oxidations such as naphthalene to phthalic anhydride and ethylene to ethylene oxide, and vapor-phase catalytic hydrogenations like the conversion of phenol to cyclohexanol.

The present invention is particularly advantageous, as indicated above, in permitting the continual recirculation of gases through the contact mass at a substantial rate under conditions of repeated contact such that substantial completion of the reaction is realized. Generally, therefore, the rate of recirculation on a gas volume basis is such that the recirculating stream is at least 1 to 10 times as great as the upflow of fresh feed reactants in the reactor, and preferably at least 3 times.

The invention is of particular benefit in connection with reactions which are desirably carried out under conditions of contact such that the linear upflow of fresh feed reactant, by itself, would be insufficient to maintain fluidization. Thus, not only is uniform fluidization realized, but the fresh feed gases are caused to contact the solid particles for an overall time period which would not be possible where fluidization is dependent upon the upflow rate of the fresh feed gases alone.

As will be apparent from the foregoing, the product gas withdrawal is desirably restricted to a minor portion of the downwardly impelled recycle gas stream, so that the desired straight-line or streamline flow about the outlet port will not be materially altered. Obviously, this requirement bears a relation to the rate of gas recirculation through the reactor, and at the preferred high rate of recirculation, it is possible to effect withdrawal of correspondingly small proportions of the regular stream without materially diverting the entrained solid particles from their predetermined, straight-line path of projection. In short, by careful observation and correlation of these factors, it is possible to realize substantially complete separation of solid particles from the withdrawn product stream.

Obviously, many modifications and variations of the invention as hereinbefore set forth may be made without departing from the spirit and scope thereof, and therefore only such limitations should be imposed as are indicated in the appended claims.

I claim:

1. A process for effecting contact between a gaseous reactant and finely divided solid particles, which comprises passing a fresh stream of said gaseous reactant upwardly through a fluidized bed of said particles in a reaction zone, withdrawing a gaseous reaction effluent containing entrained particles from the top of said fluidized bed, impelling the withdrawn effluent containing entrained particles downwardly as a high velocity stream which discharges into the bottom portion of said fluidized bed, said high velocity stream being volumetrically greater than said fresh stream, and recovering desired gaseous products of reaction substantially free of entrained particles by withdrawing a minor portion of said high velocity stream from a zone of straight-line flow in said high velocity stream, said minor portion being withdrawn in a direction laterally of the downward direction of said high velocity stream whereby the entrained particles in said high velocity stream passing through said zone of straight-line flow are projected in a straight-line path downwardly past the region of lateral withdrawal of said minor portion with the result that the withdrawn minor portion is substantially free of entrained particles.

2. A process according to claim 1 wherein the fresh stream comprises essentially hydrogen and carbon monoxide and the solid particles comprise a hydrocarbon synthesis catalyst.

3. A process according to claim 1 wherein the fresh stream is volumetrically not more than ⅓ of the high velocity stream discharging into the bottom portion of the fluidized bed.

4. A reactor for effecting contact between a gaseous reactant and finely divided solid particles in a state of dense phase fluidization, which comprises an elongate vertical vessel provided with means for introducing gaseous reactant into the bottom thereof, a conduit of substantially smaller horizontal cross-section than that of said vessel in communication at its opposite ends with the upper and lower portions, respectively, of said vessel, said conduit being the sole gas withdrawal means in the upper portion of said vessel, a mechanical impeller in the upper portion of said conduit adapted to force gas downwardly therethrough, and means for withdrawing a portion of the gas from within said conduit downstream of said impeller comprising a vertical length of said conduit having walls effective to establish straight-line gas flow therein and a port in said vertical length adapted to effect gas withdrawal in a direction laterally of said straight-line gas flow.

5. A reactor according to claim 4 wherein the conduit is free of openings between said port and the end of said conduit communicating with the lower portion of said vessel.

6. A reactor according to claim 4 wherein said port comprises a filter element having its surface parallel to the direction of said straight-line gas flow.

7. A reactor according to claim 4 wherein said port is disposed circumferentially relative to said conduit to effect said gas withdrawal in a direction laterally of said straight-line gas flow along substantially radial lines.

PAUL W. GARBO.

References Cited in the file of this patent

UNITED STATES PATENTS

| Number | Name | Date |
|---|---|---|
| 375,983 | Boehning et al. | Jan. 3, 1888 |
| 2,238,802 | Altschuler et al. | Apr. 15, 1941 |
| 2,268,187 | Churchill, Jr. | Dec. 30, 1941 |
| 2,351,091 | Bar | June 13, 1944 |
| 2,373,008 | Becker | Apr. 3, 1945 |
| 2,378,342 | Voorhees et al. | June 12, 1945 |
| 2,419,097 | Stratford et al. | Apr. 15, 1947 |
| 2,420,558 | Munday | May 13, 1947 |
| 2,429,751 | Gohr et al. | Oct. 28, 1947 |
| 2,436,957 | Eastman | Mar. 2, 1948 |
| 2,463,912 | Scharmann | Mar. 8, 1949 |
| 2,498,838 | Griffin | Feb. 28, 1950 |